United States Patent
Yang et al.

(10) Patent No.: US 10,025,483 B2
(45) Date of Patent: Jul. 17, 2018

(54) MOBILE TERMINAL AND METHOD OF CONTROLLING THE MOBILE TERMINAL

(71) Applicant: LG ELECTRONICS INC., Seoul (KR)

(72) Inventors: Soochul Yang, Seoul (KR); Kyuseok Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 63 days.

(21) Appl. No.: 14/025,426

(22) Filed: Sep. 12, 2013

(65) Prior Publication Data

US 2014/0164986 A1 Jun. 12, 2014

(30) Foreign Application Priority Data

Dec. 12, 2012 (KR) .................. 10-2012-0144626

(51) Int. Cl.
  *G06F 3/048* (2013.01)
  *G06F 3/0485* (2013.01)
  *G06F 3/0488* (2013.01)

(52) U.S. Cl.
  CPC ........ *G06F 3/0485* (2013.01); *G06F 3/04883* (2013.01); *G06F 3/04886* (2013.01); *G06F 2203/04803* (2013.01)

(58) Field of Classification Search
  CPC .. G06F 3/0485; G06F 3/0481; G06F 3/04817; G06F 3/04855; G06F 2203/04803
  USPC ................. 715/784, 765, 786, 792, 830, 838
  See application file for complete search history.

(56) References Cited

U.S. PATENT DOCUMENTS

| | | | |
|---|---|---|---|
| 8,291,320 B2* | 10/2012 | Robbin et al. | ................. 715/716 |
| 2010/0214237 A1* | 8/2010 | Echeverri | .......... G06F 3/04883 345/173 |
| 2011/0154196 A1* | 6/2011 | Icho et al. | ..................... 715/702 |

(Continued)

FOREIGN PATENT DOCUMENTS

| | | |
|---|---|---|
| CN | 1809796 | 7/2006 |
| CN | 102144213 | 8/2011 |
| CN | 102163126 | 8/2011 |

(Continued)

OTHER PUBLICATIONS

European Patent Office Application Serial No. 13184268.4, Search Report dated Dec. 20, 2016, 10 pages.

(Continued)

*Primary Examiner* — Anil N Kumar
(74) *Attorney, Agent, or Firm* — Lee Hong Degerman Kang & Waimey

(57) ABSTRACT

The present invention relates to a mobile terminal that is capable of scrolling through screen information, and a method of controlling the mobile terminal. A mobile terminal according to one embodiment of the present invention includes a main body of the mobile terminal, a display unit that displays a screen image including at least one part of screen information, and a controller that determines a direction in which scrolling-through can be performed on the screen information, based on an input signal applied to the main body, and if the direction in which the scrolling-through can be performed corresponds to a predetermined direction, divides the screen information into screen image units.

17 Claims, 16 Drawing Sheets

(56) References Cited

U.S. PATENT DOCUMENTS

2012/0072865 A1\* 3/2012 Flake .................... G06F 3/0481
                                                                               715/786
2013/0055083 A1\* 2/2013 Fino ............................. 715/716

FOREIGN PATENT DOCUMENTS

| CN | 102326136 | 1/2012 |
|----|-----------|--------|
| EP | 1046114 | 10/2000 |
| EP | 2369458 | 9/2011 |
| WO | 2011055123 | 5/2011 |

OTHER PUBLICATIONS

State Intellectual Property Office of the People's Republic of China Application Serial No. 201310615790.X, Office Action dated Sep. 5, 2017, 20 pages.

\* cited by examiner

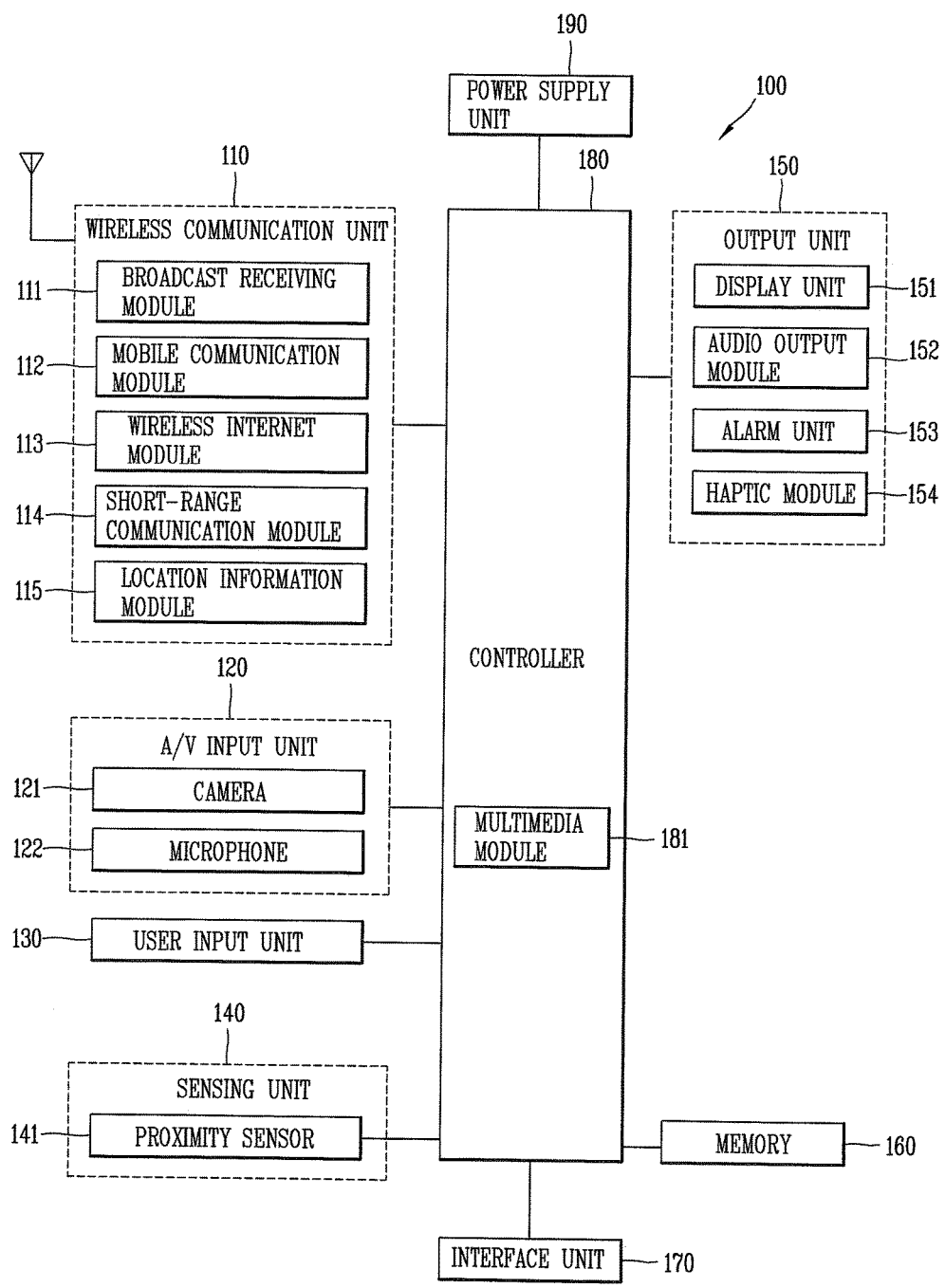

MOBILE TERMINAL AND METHOD OF CONTROLLING THE MOBILE TERMINAL

CROSS-REFERENCE TO RELATED APPLICATION

Pursuant to 35 U.S.C. § 119(a), this application claims the benefit of earlier filing date and right of priority to Korean Application No. 10-2012-0144626, filed on Dec. 12, 2012, the contents of which are incorporated by reference herein in its entirety.

BACKGROUND OF THE DISCLOSURE

1. Field of the Disclosure

The present invention relates to a mobile terminal and more particularly to a mobile terminal that is capable of outputting voice data and a method of controlling the mobile terminal.

2. Background of the Disclosure

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software.

Thanks to these improvements, the mobile terminal is capable of displaying screen information. However, a size limitation on the display units prevents an entire region of the screen information from being displayed on the display unit at one time. Accordingly, a user founds the convenience of scrolling through the screen information in order to regions other than one region of the screen information displayed on the display unit.

SUMMARY OF THE DISCLOSURE

Therefore, an aspect of the detailed description is to provide a mobile terminal that is capable of improving a user convenience in scrolling through screen information and a method of controlling the mobile terminal.

To achieve these and other advantages and in accordance with the purpose of this specification, as embodied and broadly described herein, there is provided a mobile terminal including includes a main body of the mobile terminal, a display unit that displays a screen image including at least one part of screen information, and a controller that determines a direction in which scrolling-through can be performed on the screen information, based on an input signal applied to the main body, and if the direction in which the scrolling-through can be performed corresponds to a predetermined direction, divides the screen information into screen image units.

In the embodiment, the controller may calculate the number of times that the division is made, based on an entire size of the screen information, and a size of the screen image displayed on the display unit, and may divide the screen information into the multiple items of screen information, based on the calculated number of times.

In the embodiment, if the direction in which the scrolling-through can be performed is switched from a first direction to a second direction, the controller may divide the screen information into the multiple items of screen information, and may display any one of the multiple items of screen information on the display unit that result from the division.

In the embodiment, in a state where any one of the multiple items of screen information that result from the division is displayed on the display unit, the controller may scroll through the screen information in the second direction in such a manner that the any item of screen information is switched to the different item of screen information.

In the embodiment, the controller may display thumbnail images that correspond to the multiple items of screen information that result from the division, respectively, on the display unit.

In the embodiment, the controller may display the thumbnail images in such a manner that the thumbnail images overlap any one of the items of screen information that result from the division, displayed on the display unit.

In the embodiment, if any one of the thumbnail images are selected, the controller may display the screen information corresponding to the selected thumbnail image of the multiple items of screen information that result from the division, on the display unit.

In the embodiment, based on a touch input applied to the display unit, the controller may make any one of the multiple items of screen information that result from the division, displayed on the display unit, disappear, and may display the multiple thumbnail images on the display unit.

In the embodiment, based on the touch input applied to each of the thumbnail images, the controller may edit the thumbnail images and may generate the screen information reflecting a result of the editing.

In the embodiment, the controller may calculate the number of times that the division is made based on the number of items of image information included in the screen information and may divide the screen information into the multiple items of screen information, based on the calculated number of times, in such a manner that the multiple items of screen information include their respective items of image information.

In the embodiment, the controller may display thumbnail images that correspond to multiple items of image information, respectively, on the display unit.

In the embodiment, if any one of the thumbnail images is selected, the controller may display the image information corresponding to the selected thumbnail image, and text information relating to the image information on the display unit.

In the embodiment, the controller may display a virtual button relating to the direction in which the scrolling-through can be performed, on the display unit, and, based on a touch input with respect to the virtual button, may determine the direction in which the scrolling-through can be performed on the screen information.

In the embodiment, the mobile terminal may further include a sensing unit that senses a direction toward which the main body is oriented, and in the mobile terminal, the controller may determine the direction in which the scrolling-through can be performed on the screen information, based on the direction toward which the main body is oriented.

In the embodiment, the controller may sense a direction in which a touch input is applied to the display unit, and, based on the direction of the touch input, may determine the direction in which the scrolling-through can be performed on the screen information.

To achieve these and other advantages and in accordance with the purpose of this specification, as embodied and broadly described herein, there is provided a method of controlling a mobile terminal including displaying a screen image including at least one part of screen information on a display unit, determining a direction in which scrolling-through can be performed on the screen information, based on an input signal applied to the main body, and dividing the screen information into screen image units if the direction in which the scrolling-through can be performed corresponds to a predetermined direction.

In the embodiment, in the method of controlling a mobile terminal according to claim 16, if the direction in which the scrolling-through can be performed corresponds to the predetermined direction, the dividing of the screen information into the multiple items of screen information may include calculating the number of times that the division is made, based on an entire size of the screen information, and a size of the screen image displayed on the display unit, and dividing the screen information into the multiple items of screen information based on the calculated number of times.

In the embodiment, in the method of controlling a mobile terminal according to claim 17, if the direction in which the scrolling-through can be performed corresponds to the predetermined direction, the dividing of the screen information into the multiple items of screen information may include dividing the screen information into the multiple items of screen information if the direction in which the scrolling-through can be performed is switched from a first direction to a second direction, and displaying any one of the multiple items of screen information that result from the division, on the display unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 is a block diagram illustrating a mobile terminal according to the present invention;

DETAILED DESCRIPTION OF THE DISCLOSURE

Figure 2A:
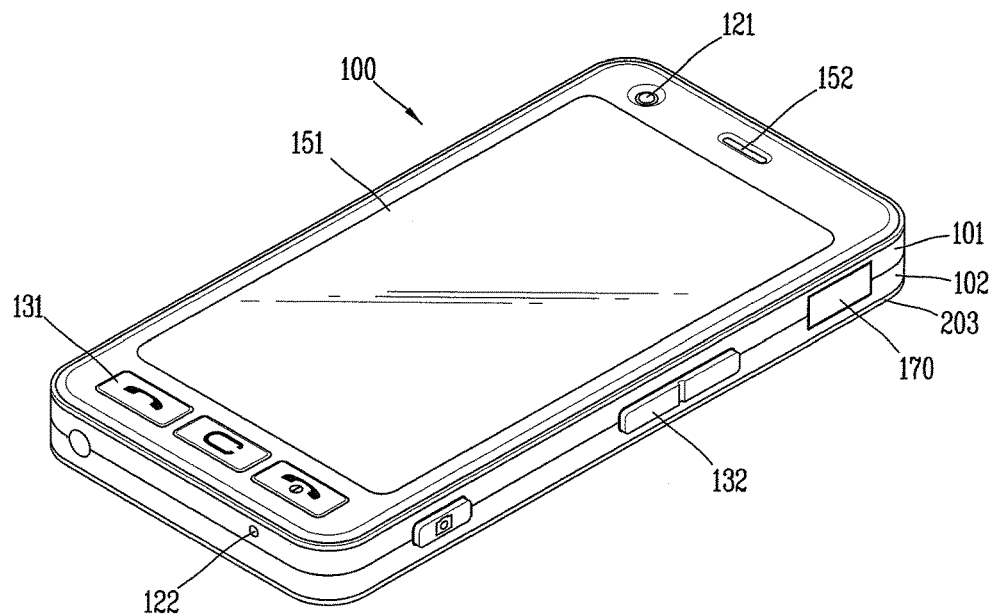
FIGS. 2A and 2B are perspective views, each illustrating an external appearance of the mobile terminal according to the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

FIG. 1 is a block diagram of a mobile terminal 100 according to one embodiment of the present disclosure.

Referring to FIG. 1, the mobile terminal 100 may comprise components, such as a wireless communication unit 110, an Audio/Video (A/V) input unit 120, a user input unit 130, a sensing unit 140, an output unit 150, a memory 160, an interface unit 170, a controller 180 and a power supply unit 190. FIG. 1 shows the mobile terminal 100 having various components, but it is understood that implementing all of the illustrated components is not a requirement. Greater or fewer components may alternatively be implemented.

Hereinafter, each component 110~190 of the mobile terminal 100 will be explained in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114 and a position information module 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network. In this case, the broadcast associated information may be received by the mobile communication module 112. The broadcast signals and the broadcast associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display unit 151. The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that senses changes in resistance, pressure, capacitance, etc. due to being contacted) a jog wheel, a jog switch, and the like.

The sensing unit 140 senses a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can sense whether or not the power supply unit 190 supplies power or whether or not the interface unit 170 is coupled with an external device.

The sensing unit 140 may include a proximity sensor 141. And, the touch sensor 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

If the display unit 151 and the touch sensor have a layered structure therebetween, the display unit 151 may be used as an input device rather than an output device. The display unit 151 may be referred to as a 'touch screen'.

When touch inputs to the touch screen are sensed, corresponding signals are transmitted to a touch controller (not shown). The touch controller processes the received signals, and then transmits corresponding data to the controller 180. Accordingly, the controller 180 may sense which region of the display unit 151 has been touched.

When the touch screen is implemented as a capacitance type, proximity of a pointer to the touch screen is sensed by changes of an electromagnetic field. In this case, the touch screen (touch sensor) may be categorized into a proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to provide outputs in a visual, audible, and/or tactile manner. The output unit 150 may include the display unit 151, an audio output module 153, an alarm unit 154 and a haptic module 155.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

At least one of the displays of the display unit 151 may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer, and so on.

The alarm unit 154 may provide outputs to inform about the occurrence of an event of the mobile terminal 100. Typical events may include call reception, message reception, key signal inputs, a touch input, etc. In addition to audio or video outputs, the alarm unit 154 may provide outputs in a different manner to inform about the occurrence of an event. The video signal or the audio signal may be output via the display unit 151 or the audio output module 153. Accordingly, the display unit 151 or the audio output module 153 may be classified as part of the alarm unit 154.

The haptic module 155 generates various tactile effects which a user can feel. A representative example of the tactile effects generated by the haptic module 155 includes vibration. Vibration generated by the haptic module 155 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects (signals) through a user's direct contact, or a user's muscular sense using a finger or a hand. The haptic module 155 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, will be explained a method for processing a user's input to the mobile terminal 100.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as characters, numbers, symbols, graphics and icons. Alternatively, such information may be implemented as 3D stereoscopic images. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another. For example, an output window and an input window may be displayed at upper and lower portions of the display unit 151, respectively. The output window and the input window are configured to output and input information, respectively. Soft keys representing numbers for inputting telephone numbers or the like may be output on the input window. Once a soft key is touched, a number or the like corresponding to the touched soft key is displayed to the output window. Upon manipulating the manipulation unit, a call connection for a telephone number displayed on the output window is attempted, or a text output on the output window may be input to an application.

The display unit 151 or the touch pad may be configured to sense a touch scroll. A user may scroll the display unit 151 or the touch pad to move a cursor or a pointer positioned on an object displayed on the display unit 151 (e.g., an icon). In addition, in case of moving a finger on the display unit 151 or the touch pad, the path of the finger being moved may be visibly displayed on the display unit 151, which can be useful upon editing an image displayed on the display unit 151.

One function of the mobile terminal 100 may be executed in correspondence with a case where the display unit 151 and the touch pad are touched together within a preset time. An example of being touched together may include clamping a terminal body with the user's thumb and index fingers. The one function, for example, may be activating or deactivating the display unit 151 or the touch pad.

Figure 2B:
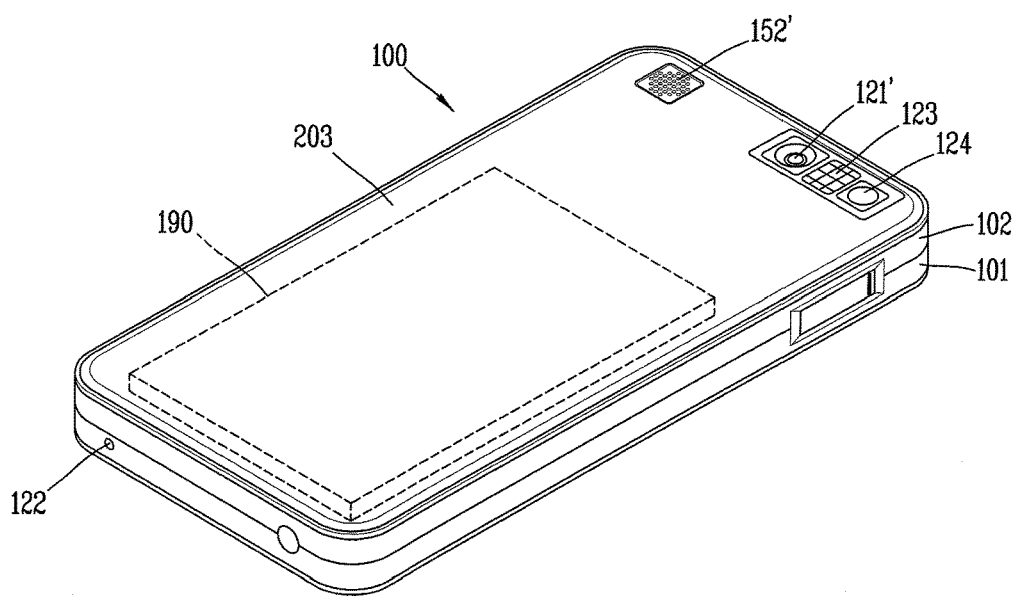

FIG. 2A is a view showing a front surface and one side surface of the mobile terminal 100, which illustrates the appearance of the mobile terminal 100 in accordance with the present disclosure. FIG. 2B is a view showing a rear surface and another side surface of the mobile terminal 100.

As shown in FIG. 2A, the mobile terminal 100 is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming the appearance of a terminal body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, a sound output module 152, a camera 121, a user input unit 130 (refer to FIG. 1), a microphone 122, an interface unit 170, etc.

The display unit 151 occupies most parts of a main surface of the front case 101. The sound output module 152 and the camera 121 are arranged at a region adjacent to one end of the display unit 151, and the user input unit 131 and the microphone 122 are arranged at a region adjacent to another end of the display unit 151. The user input unit 132, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132.

The manipulation units 131 and 132 may receive various commands. For instance, the first manipulation 131 is configured to input commands such as START, END, SCROLL or the like, and the second manipulation unit 132 is configured to input commands for controlling a level of sound outputted from the sound output module 152, or commands for converting the current mode of the display unit 151 to a touch recognition mode.

Referring to FIG. 2B, a camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution), whereas the camera 121' may operate with a relatively higher pixels (higher resolution). Thus, the camera 121 may be useful when a user can capture his face and send it to another party during a video call or the like. This can reduce a size of transmission data. On the other hand, the camera 121' may be used to store images of a high picture quality.

The cameras 121 and 121' may be installed at the terminal body so as to rotate or pop-up.

A flash 123 and a mirror 124 (not shown) may be additionally disposed close to the camera 121'. The flash 123 operates in conjunction with the camera 121' when taking a picture using the camera 121'. The mirror 124 can cooperate with the camera 121' to allow a user to photograph himself in a self-portrait mode.

A sound output module 152' may be additionally arranged on a rear surface of the terminal body. The sound output module 152' may cooperate with the sound output module 152 (refer to FIG. 2A) so as to implement a stereo function. Also, the sound output module 152' may be configured to operate as a speakerphone during a call.

A broadcast signal receiving antenna 116 as well as an antenna for calling may be additionally disposed on a side surface of the terminal body. The broadcast signal receiving antenna 116 of the broadcast receiving module 111 (refer to FIG. 1) may be configured to retract into the terminal body.

A power supply unit 190 for supplying power to the mobile terminal 100 is mounted to the terminal body. The power supply unit 190 may be mounted in the terminal body, or may be detachably mounted to the terminal body.

A touch pad 135 for sensing touch may be additionally mounted to the rear case 102. Like the display unit 151 (refer to FIG. 2A), the touch pad 135 may be formed to be light-transmissive. The touch pad 135 may be also additionally mounted with a rear display unit for outputting visual information. Information output from the display unit 151 (front display) and the rear display can be controlled by the touch pad 135.

The touch pad 135 operates in association with the display unit 151. The touch pad 135 may be disposed on the rear surface of the display unit 151 in parallel. The touch pad 135 may have a size equal to or smaller than that of the display unit 151.

On the other hand, the mobile terminal 100 displays screen information. However, a size limitation on the display unit 151 prevents an entire region of the screen information from being displayed on the display unit 151 at one time. Accordingly, a user founds the convenience of scrolling through the screen information in order to view regions other than one region of the screen information displayed on the display unit.

As a solution to such a problem, the mobile terminal 100 that is capable of providing a user convenience in scrolling through the screen information and a method of controlling the mobile terminal 100 are described below referring to the accompanying drawings.

Figure 3:
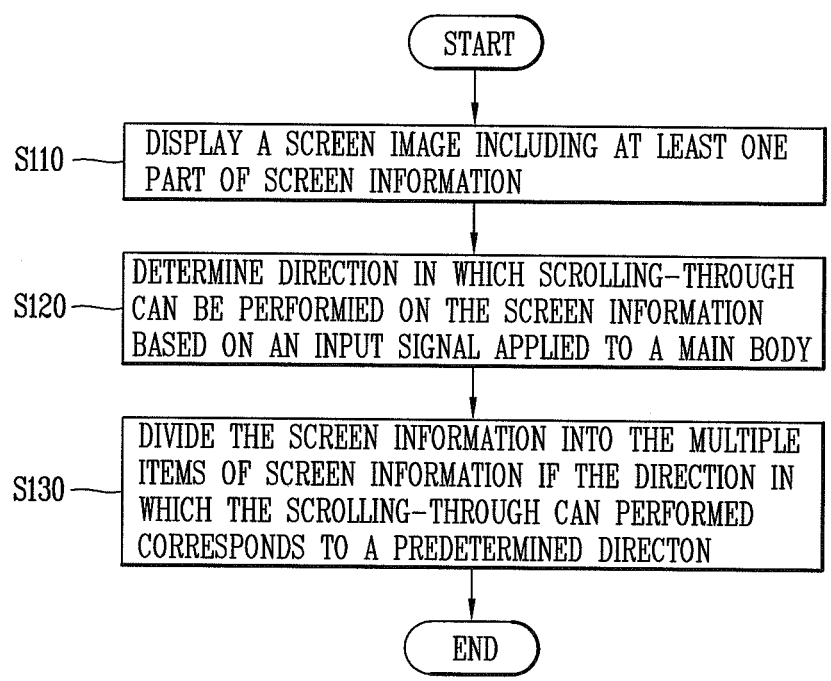
FIG. 3 is a flowchart for describing one embodiment of the mobile terminal according to the present invention.

FIG. 3 is a flowchart for describing one embodiment of the mobile terminal 100 (refer to FIG. 1) according to the present invention. The mobile terminal 100 includes a main body, a display unit 151 (refer to FIG. 1), and a controller 180 (refer to FIG. 1).

Referring to FIG. 3, first, Step S110 of displaying a screen image including at least one part of the screen information in the display unit 151 proceeds.

At least one of a page of text or image, a web page, an E-mail message, an electronic document (E-document), and content provided by a social network service (SNS) is displayed on the display unit 151. The screen image here means information displayed on one screen of the display unit 151.

Next, Step S120 of determining a direction in which scrolling-through can be performed on the screen information, based on an input signal applied to the main body proceeds.

The scrolling-through here means an upward and downward, or leftward and rightward movement of the entire information based on a pressure applied from the outside when an amount of information in one page exceeds a display capacity of one screen.

Specifically, according to one embodiment, the control 180 displays virtual buttons that correspond to the directions in which the scrolling-through is performed, respectively, on the display unit 151. For example, the controller 180 may display arrow-shaped objects that indicate the directions in which the scrolling-through is performed, respectively, on the display unit 151. At this time, when selecting at least one of the objects, the direction that corresponds to the selected object is determined as the direction in which the scrolling-through can be performed.

In another embodiment, a sensing unit 140 (refer to FIG. 1) senses the direction toward which the main body of the mobile terminal is oriented. The controller 180 determines the direction in which the scrolling-through can be performed, based on the direction toward which the main body is oriented. For example, if the direction of display of the screen information on the display unit 151 depending on the direction toward which the main body is oriented is switched from a portrait direction to a landscape direction, the controller 180 switches the direction in which the scrolling-through can be performed from the upward and downward direction to the leftward and rightward direction.

On the other hand, in another embodiment, if a flick input or a drag input is sensed on the page, the controller 180 scrolls through the screen information in a direction of the flick input or a direction of the drag input. The flick input here means a touch gesture which is represented by starting coordinates and ending coordinates and by which dragging is performed in an arbitrary direction and then is released. For example, if the flick input in the upward and downward direction is sensed on the screen information and then the flick input in the leftward and rightward direction is sensed, the controller 180 switches the direction in which the scrolling-through can be performed from the upward and downward direction to the leftward and rightward direction.

Thereafter, if the direction in which the scrolling-through can be performed corresponds to a predetermined direction, Step S130 of dividing the screen information into multiple display units, that is, multiple screen image units, proceeds.

Specifically, in one example, the controller 180 calculates the number of times that the division is made, based on an entire size of the screen information and a size of the screen image displayed on the display unit 151, and divides the screen information into multiple items of screen information, based on the calculated number of times. Then, the controller 180 displays at least one of the resulting multiple items of screen information on the display unit 151. At this time, thumbnail images corresponding to the multiple items of screen information, respectively, are displayed on the display unit 151.

On the other hand, in another embodiment, the controller 180 may calculate the number of times that the division is made, based on the number of the items of image information included in the screen information, and may divide the screen information into the multiple items of screen information, based on the calculated number of times, in such a manner that the multiple items of screen information include their respective items of image information. At this time, thumbnail images corresponding to the multiple items of screen information, respectively, are displayed on the display unit 151.

As described above, according to the present invention, the direction in which the scrolling-through can be performed on the screen information is selected. In addition, the screen information is divided into the multiple items of screen information depending on selection of the direction in which the scrolling-through can be performed. Accordingly, if the direction toward which the main body of the mobile terminal is oriented is changed from the portrait direction to the landscape direction and thus an amount of screen information is decreased, the number of times that the scrolling-through is performed is decreased. As a result, the user convenience can be improved.

Figure 4:
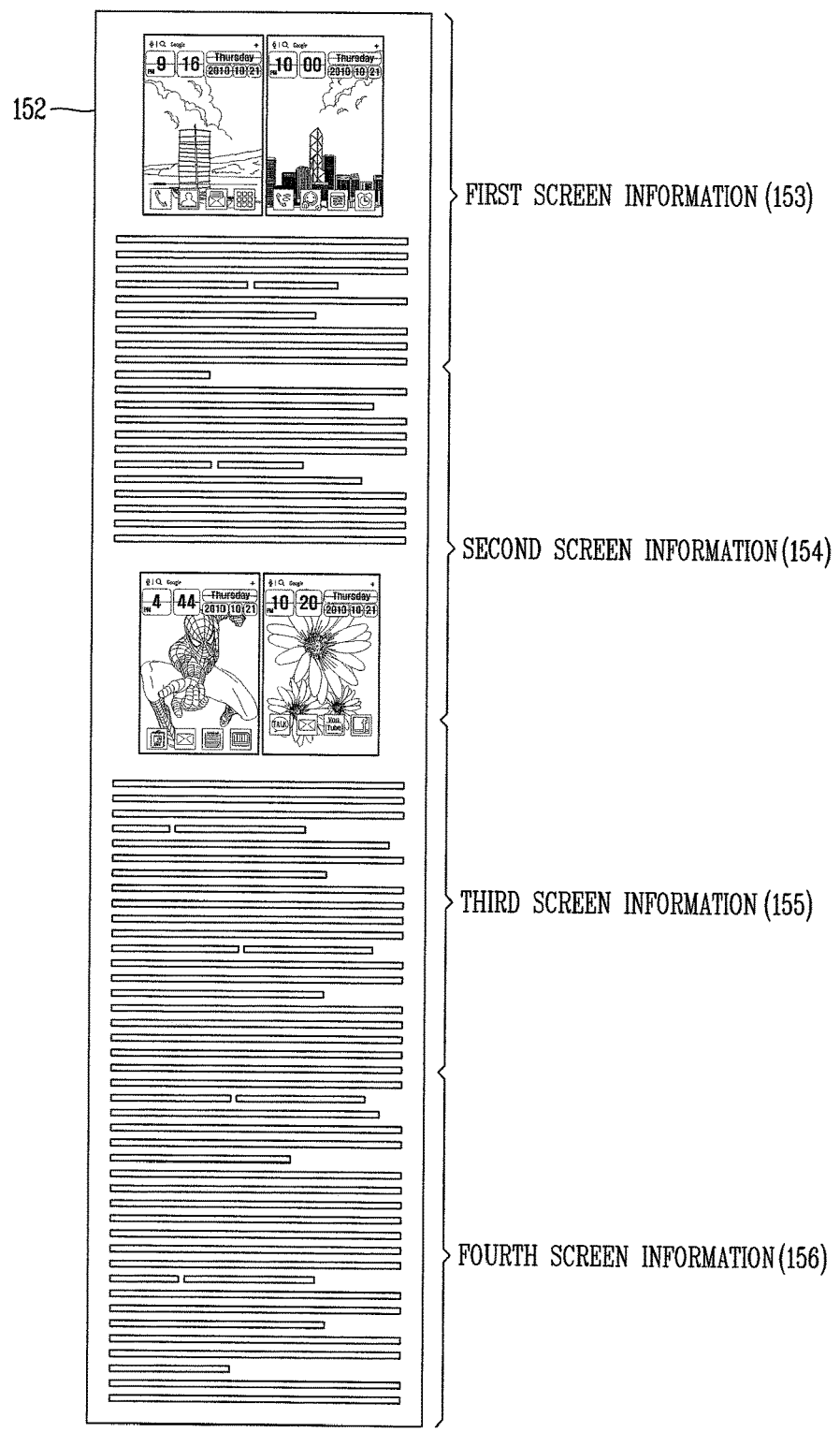
FIG. 4 is a diagram illustrating an example of division of screen information, based on FIG. 3.

FIG. 4 is a diagram illustrating an example of division of screen information, based on FIG. 3. The mobile terminal 100 (refer to FIG. 1) includes the main body, the display unit 151 (refer to FIG. 1), and the controller 180 (refer to FIG. 1).

Because of the size limitation on the display unit 151, the screen image including at least one part of the screen information 152 is displayed on the display unit 151. The screen image here means information displayed on one screen of the display unit 151.

Accordingly, the controller 180 divides the screen information 152 into screen image units. At this time, the controller 180 calculates the number of times that the screen information 152 is divided, based on the entire size of the screen information 152 and the size of a screen image displayed on one screen of the display unit 151. The controller 180 divides the screen information 152 into the multiple items of screen information, based on the calculated number of times.

As illustrated, considering a size of the screen image, the controller 180 divides the screen information 152 into first information 153 to fourth information 156.

Figure 5:
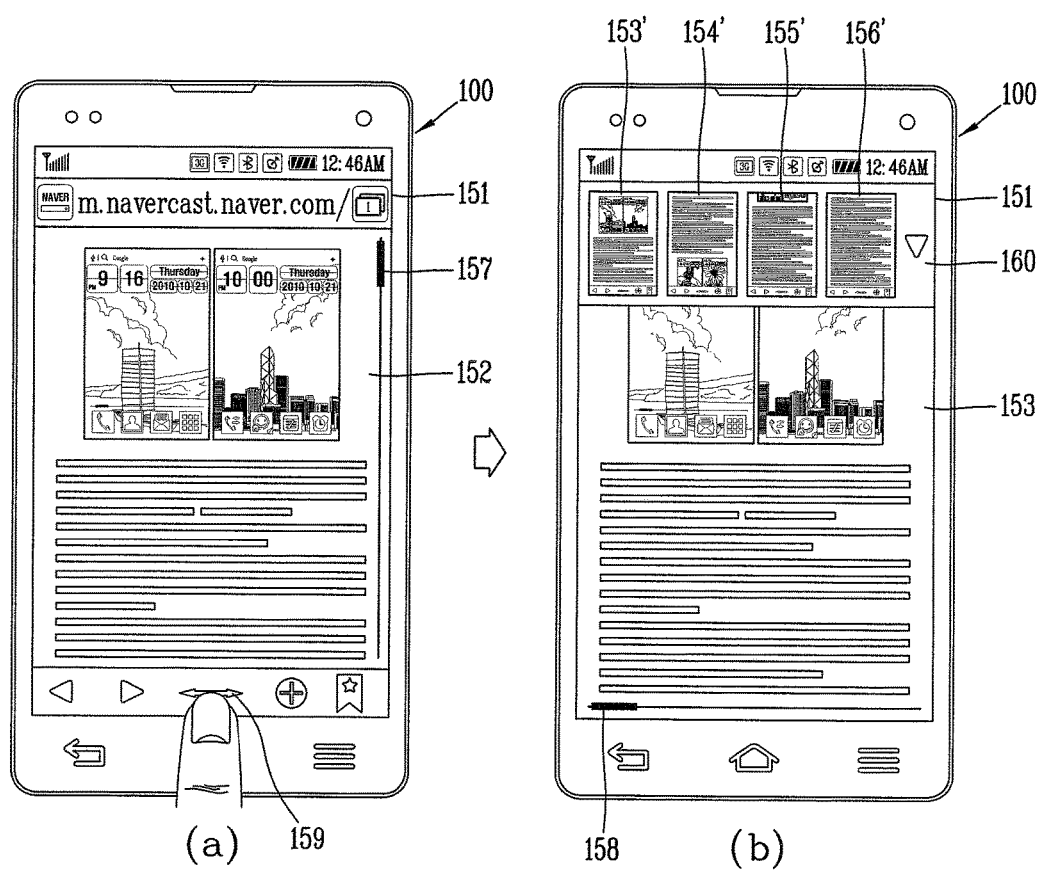
FIG. 5 to FIG. 12 are diagrams, each illustrating an operational example of the mobile terminal, based on FIG. 3.
Figure 6:
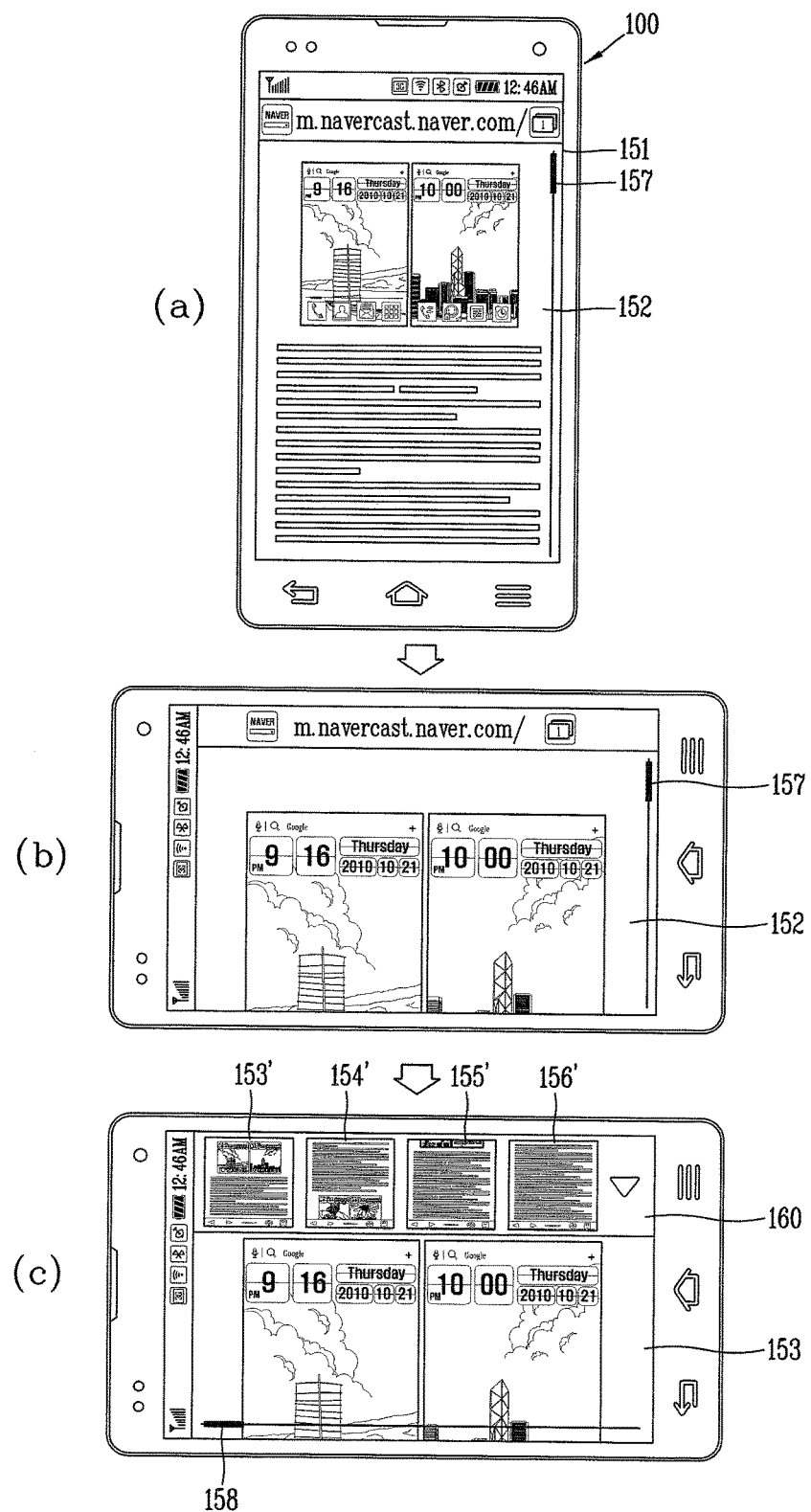
Figure 7:
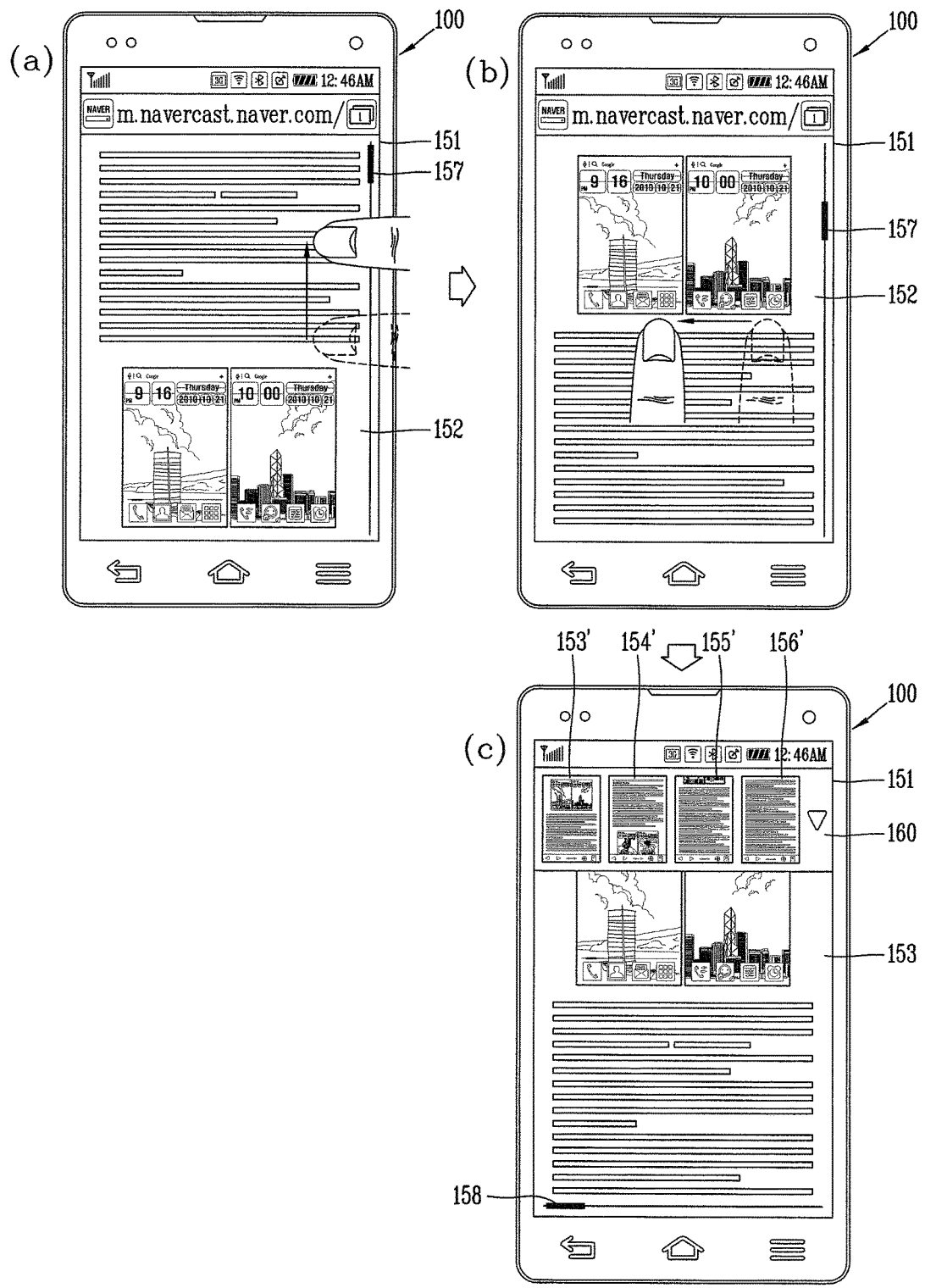

FIG. 5 to FIG. 7 are diagrams, each illustrating an operational example of the mobile terminal 100, based on FIG. 3. The mobile terminal 100 includes the main body, the display unit 151 (refer to FIG. 1) and the controller 180 (refer to FIG. 1).

Referring to FIG. 5(a), the controller 180 displays the virtual button 159, which corresponds to a function of switching the direction in which the scrolling-through will be performed, on the display unit 151. As illustrated, the display unit 151 displays at least one part of the screen information 152. The screen information 152 is scrolled through in a first direction (for example, in the upward and downward direction). Accordingly, a scroll bar 157, which indicates that the screen information 152 can be scrolled through in the first direction, is displayed on the display unit 151.

Referring to FIG. 5(b), if the virtual button 159 is touched on, the controller 180 switches the direction in which the scrolling-through can be performed from the first direction to a second direction (for example, the leftward and rightward direction). Accordingly, the scroll bar 158, which indicates that the screen information 152 can be scrolled through in the second direction, is displayed on the display unit 151.

While switching the direction in which the scrolling-through can be performed, to the second direction, the controller 180 divides the screen information 152 into the multiple items of screen information (hereinafter referred to as the first screen information 153 to the fourth screen information 156). The controller 180 displays the first screen information 153 of the first screen information 153 to the fourth screen information 156 on the display unit 151.

Along with this, the controller 180 displays the multiple thumbnail images (hereinafter referred to as first to fourth thumbnail images) 153' to 156', which correspond to the first screen information 153 to the fourth screen information 156, respectively, on the display unit 151. The first to fourth thumbnail images 153' to 156' are displayed on the first screen information 153 displayed on the display unit 151, in an overlapping manner.

Referring FIGS. 6(a) and (b), the sensing unit 140 (refer to FIG. 1) senses the direction toward which the main body of the mobile terminal is oriented. To do this, the sensing unit 140 includes a motion recognition sensor (not illustrated). The motion recognition sensor includes at least one of a terrestrial magnetism sensor, a gyro sensor, and an acceleration sensor.

The terrestrial magnetism sensor is a sensor that detects the direction and size of terrestrial magnetism and generates an electrical signal using the detected direction and size of terrestrial magnetism. The gyro sensor is a sensor that detects a rotation speed of the main body and generates the electrical signal using the detected rotation speed. The acceleration sensor is a sensor that measures the direction of gravitational acceleration, detects a change in acceleration in a given direction and generates the electrical signal using the detected change in acceleration.

Accordingly, the sensing unit 140 senses whether the main body is rotated. That is, the sensing unit 140 detects displacement that depends on the rotation of the main body, that is, the rotational direction and the rotational angle and generates the electrical signal using the detected rotational direction and rotational angle. The sensing unit 140 senses the direction toward which the main body is oriented by detecting the rotational direction and the rotational angle of the main body.

Referring to FIG. 6(c), the controller 180 determines the direction in which the scrolling-through can be performed on the screen information, based on the direction toward which the main body is oriented. For example, if the direction of display of the screen information on the display unit 151 depending on the direction toward which the main body is oriented is switched from the first direction (for example, the portrait direction) to the second direction (for example, the landscape direction), the controller 180 switches the direction in which the scrolling-through can be performed from the first direction (for example, the upward and downward direction to the second direction (for example, the leftward and rightward direction). Accordingly, the scroll bar 158, which indicates that the screen information 152 can be scrolled through in the second direction, is displayed on the display unit 151.

While switching the direction in which the scrolling-through can be performed, to the second direction, the controller 180 divides the screen information 152 into the multiple items of screen information (hereinafter referred to as the first screen information to the fourth screen information) 153 to 156, and displays the result on the display unit 151. Along with this, the controller 180 displays the multiple thumbnail images (hereinafter referred to as first to fourth thumbnail images) 153' to 156', which correspond to the first screen information 153 to the fourth screen information 156, respectively, on the display unit 151.

Referring to FIG. 7(a), if the flick input or the drag input in the first direction (for example, in the upward and downward direction) is sensed on the screen information 152, the controller 180 scrolls through the screen information 152 in the first information. At this time, the scroll bar 157, which indicates that the screen information 152 can be scrolled through in the first direction, is displayed on the display unit 151.

On the other hand, referring to FIGS. 7(b) and (c), if the flick input or the drag input in the second direction (for example, in the leftward and rightward direction) is sensed on the screen information 152 on which the scrolling-through can be performed, the controller 180 scrolls through the screen information 152 in the second information. That is, the controller 180 switches the direction in which the scrolling-through can be performed from the first direction to the second direction. Accordingly, the scroll bar 158, which indicates that the screen information 152 can be scrolled through in the second direction, is displayed on the display unit 151.

While switching the direction in which the scrolling-through can be performed, to the second direction, the controller 180 divides the screen information 152 into the multiple items of screen information (hereinafter referred to as the first screen information to the fourth screen information) 153 to 156, and displays the result on the display unit 151. Along with this, the controller 180 displays the multiple thumbnail images (hereinafter referred to as the first to fourth thumbnail images) 153' to 156', which correspond to the first screen information 153 to the fourth screen information 156, respectively, on the display unit 151.

FIG. 8(a) to (c) and FIGS. 9(a) and (b) are diagrams, each illustrating an operational example of the mobile terminal 100, based on FIG. 3. The mobile terminal 100 includes the main body, the display unit 151 (refer to FIG. 1), and the controller 180 (refer to FIG. 1).

Figure 8:
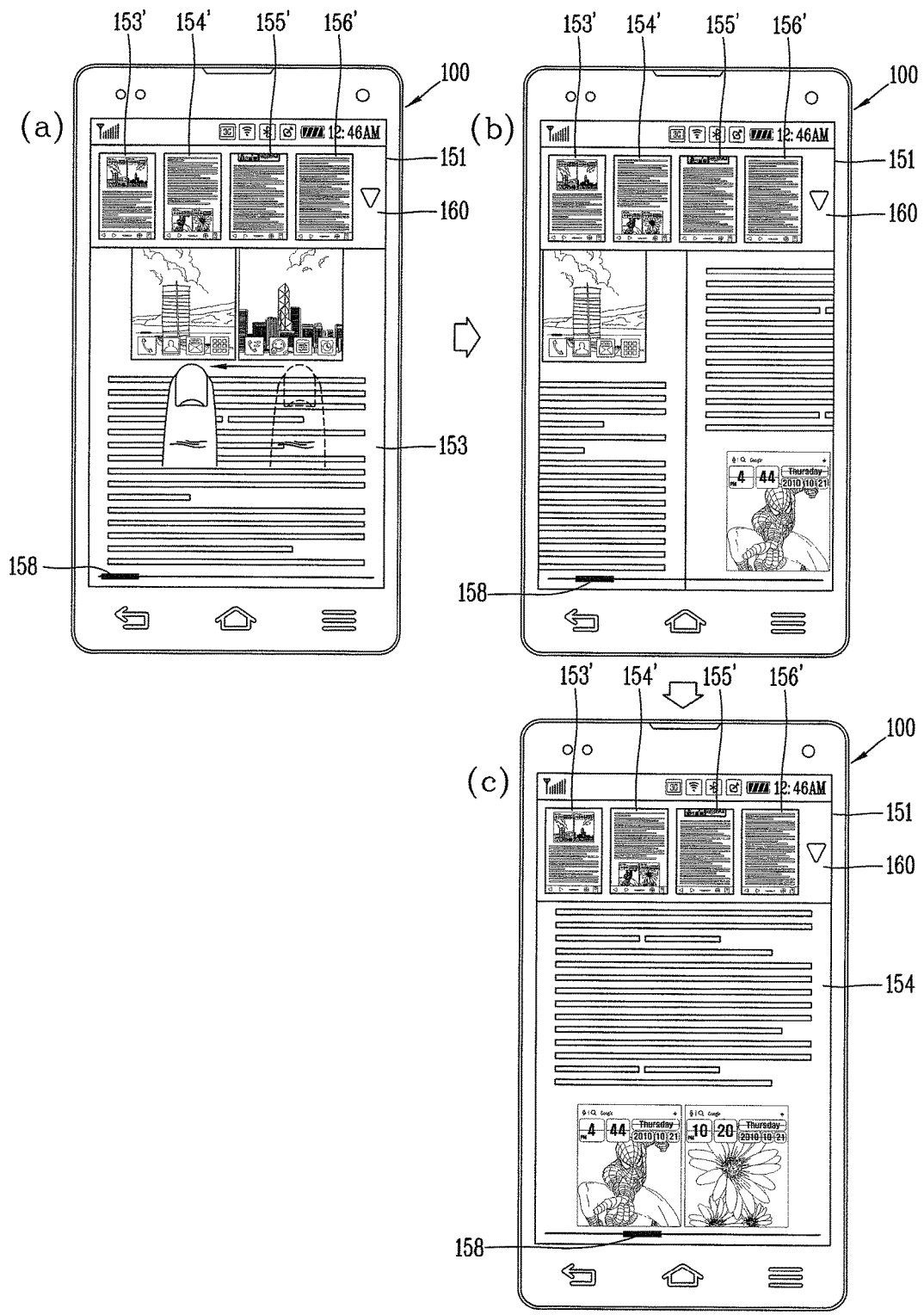

Referring to FIG. 8(a), while switching the direction in which the scrolling-through can be performed from the first direction to the second direction, the controller 180 divides the screen information 152 into the screen image units. Accordingly, the screen information 152 is divided into the first screen information 153 to the fourth screen information 156. The controller 180 displays the first screen information 153 of the first screen information 153 to the fourth screen information 156 on the display unit 151. Along with this, the controller 180 displays the first to fourth thumbnail images 153' to 156', which correspond to the first screen information 153 to the fourth screen information 156, respectively, on the display unit 151.

At this time, referring to FIGS. 8(b) and (c), if the flick input or the drag input in the second direction is sensed on the display unit 151, the controller 180 makes the first screen information 153 disappear from the display unit 151 and displays the second screen information 154 on the display unit 151.

At this time, as described, the controller 180 assigns an effect that makes one region of the first screen information 153 disappear from the display unit 151, and at the same time increasingly displays one region of the second screen information 154 on the display unit 151.

That is, the user can view other parts of the screen information 152 as if he/she would turn over pages in a book, by applying a flick input or drag input pressure in the second direction.

Figure 9:
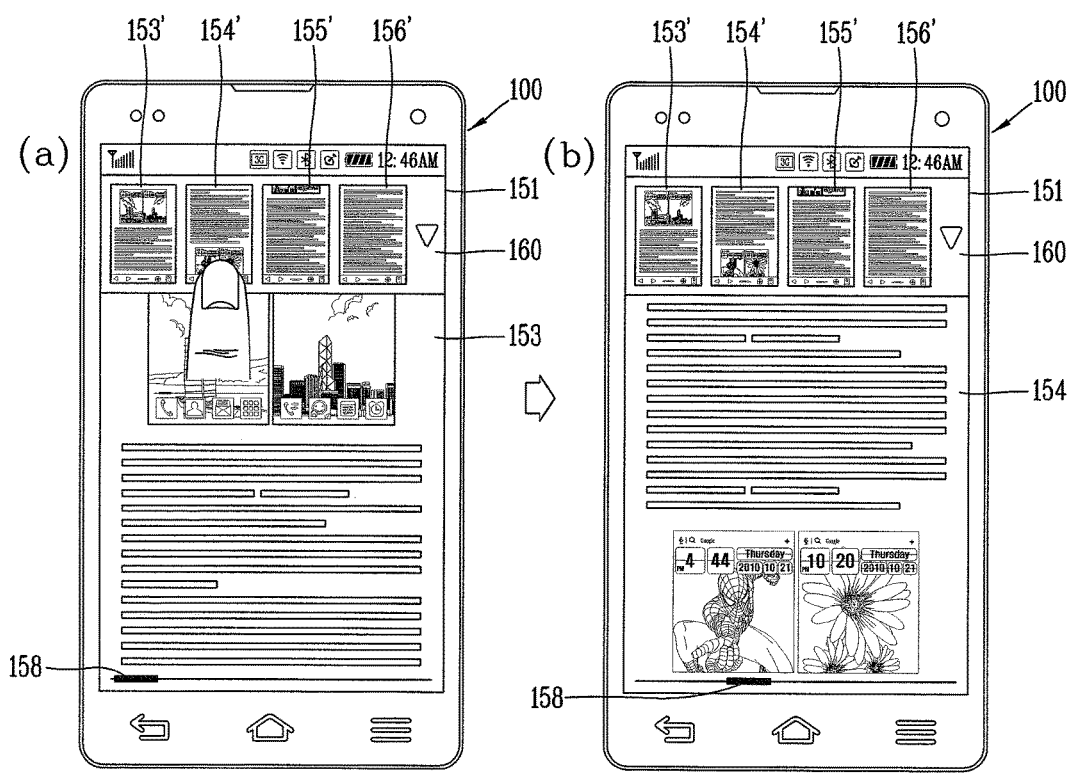

Referring to FIG. 9(a), while switching the direction in which the scrolling-through can be performed, from the first direction to the second direction, the controller 180 displays the first screen information 153 on the display unit 151. Along with this, the controller 180 displays the first to fourth thumbnail images 153' to 156', which correspond to the first screen information 153 to the fourth screen information 156, respectively, on the display unit 151.

At this time, if any one (for example, the second thumbnail image) 154' of the first to fourth thumbnail images 153' to 156' is selected, referring to FIG. 9(b), the controller 180 displays the second screen information 154 corresponding to the selected second thumbnail image 154' on the display unit 151.

That is, the user can select one part of the screen information to be displayed on the display unit 151, through the use of the touch input with respect to the first to fourth thumbnail images 153' and 156'.

FIG. 10(a) to (c), and FIGS. 12(a) and (b) are diagrams, each illustrating an operational example of the mobile terminal 100, based on FIG. 3. The mobile terminal 100 includes the main body, the display unit 151 (refer to FIG. 1) and the controller 180 (refer to FIG. 1).

Figure 10:
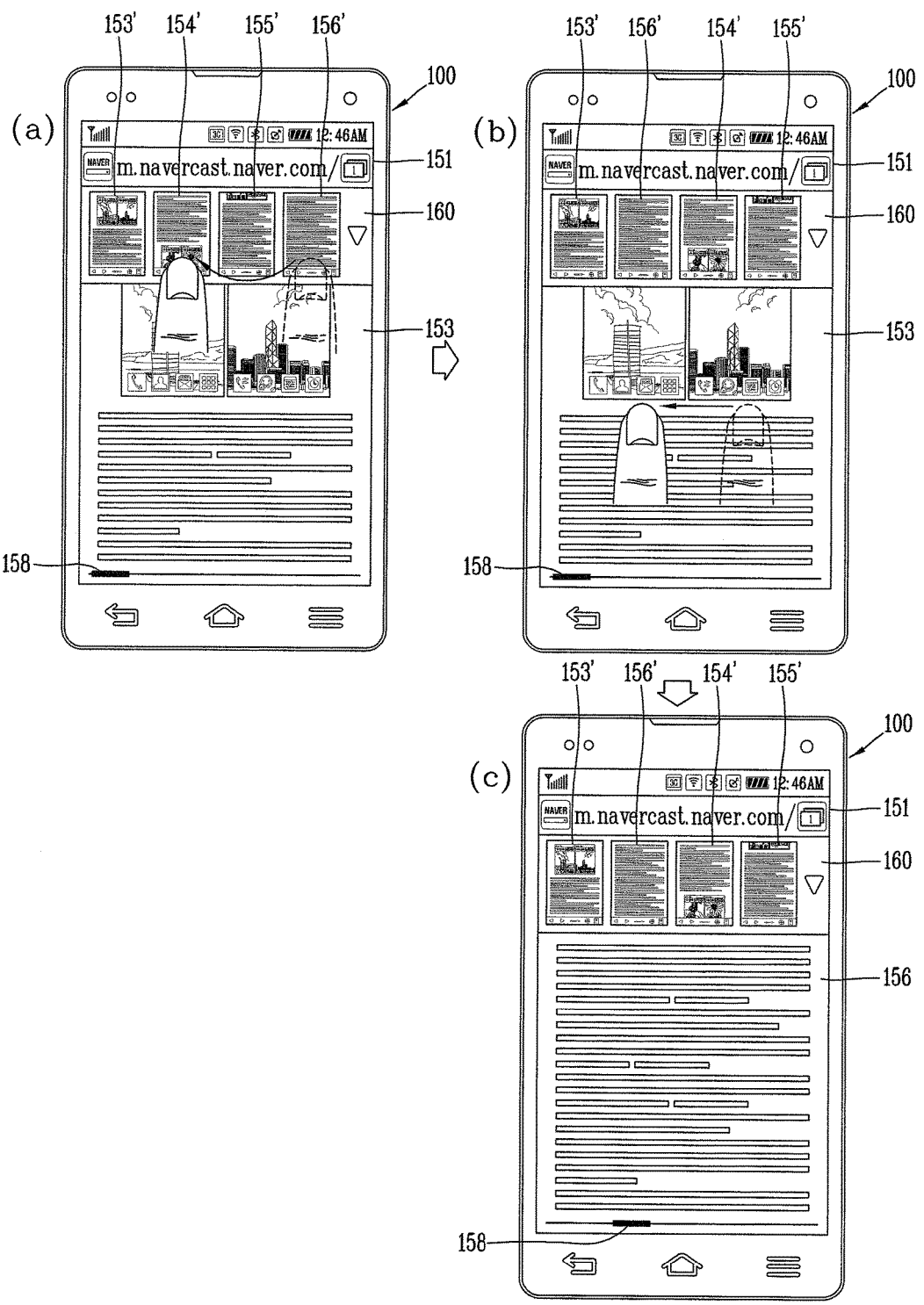

Referring to FIG. 10(a), while switching the direction in which the scrolling-through can be performed, from the first direction to the second direction, the controller 180 displays the first to fourth thumbnail images 153' to 156', which correspond to the first screen information 153 to the fourth screen information 156, respectively, on one region 160 (hereinafter referred to as a "thumbnail image display region) of the display unit 151.

The controller 180 changes the order of the display of the first screen information 153 to the fourth screen information 156, which correspond to the first and fourth thumbnail images 153' to 156', respectively, based on the touch input with respect to the first to fourth thumbnail images 153' to 156'.

Specifically, referring to FIG. 10(b), if any one 156' (for example, the fourth thumbnail image) of the first to fourth thumbnail images 153' to 156' is dragged toward the different one (for example, the second thumbnail image) 154', the controller 180 changes the order of arrangement of the first to fourth thumbnail images 153' and 156'. As illustrated, the first to fourth thumbnail images 153' to 156' may be arranged on a thumbnail image display region 160, in the following sequence: the first thumbnail image 153', the fourth thumbnail image 156', the second thumbnail image 154', the third thumbnail image 155'.

At this time, if the flick input or the drag input in the second direction is sensed on the display unit 151, referring to FIG. 10(c), the controller 180 makes the first screen information 153 disappear from the display unit 151 and displays the fourth screen information 156 on the display unit 151.

That is, the controller 180 changes the order of the display of the first screen information 153 to the fourth screen information 156, based on the arrangement order in which the first to fourth thumbnail images 153' to 156' are newly arranged. In addition, the controller 180 shares the first screen information 153 to the fourth screen information 156 of which the display order is changed, with the one at the other end of the communication.

Although not illustrated, the controller 180 edits the screen information 152 by deleting at least one of the first to fourth thumbnail images 153' and 156', or adding a new thumbnail image. The controller 180 shares the edited screen information with the one at the other end of the communication.

Figure 11:
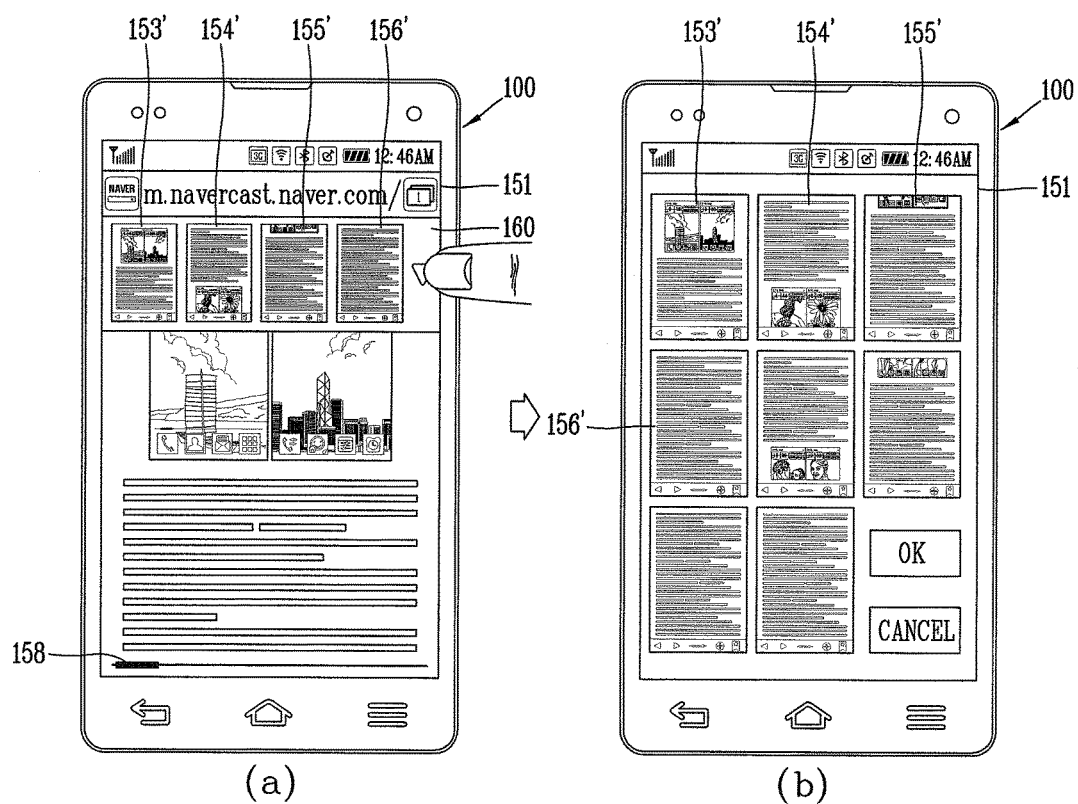

Referring to FIG. 11(a), the controller 180 displays parts (the first to fourth thumbnail images) 153' to 156' of the multiple thumbnail images, which correspond to the multiple items of screen information, respectively, on the thumbnail image display region 160 of the display unit 151. The thumbnail image display region 160 may be displayed on the first screen information 153 displayed on the display unit 151, in an overlapping manner.

On the other hand, as illustrated, an icon corresponding to a function of displaying all of the multiple thumbnail images is included in the thumbnail image display region 160. If the icon is selected, as illustrated in FIG. 11(b), the controller 180 displays all of the multiple thumbnail images on the display unit 151.

That is, the controller 180 makes the first screen information and the thumbnail image display region 160 disappear from the display unit 151, and displays all of the multiple thumbnail images on the display unit 151.

Although not illustrated, if a menu item (hereinafter referred to as a Book item") that corresponds to the function of displaying all of the multiple thumbnail images is selected from among the menu items, the controller 180 also displays all of the multiple thumbnail images on the display unit 151.

Figure 12:
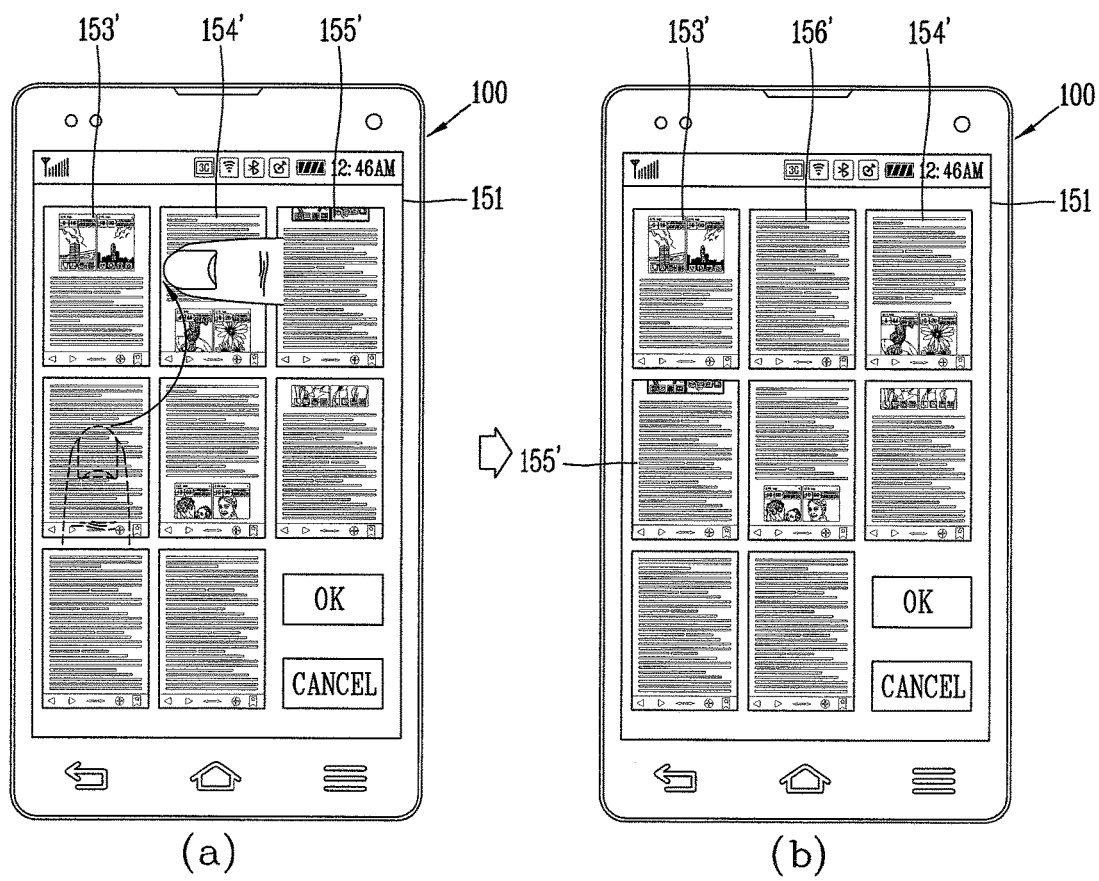

Referring to FIG. 12(a), the controller 180 edits the thumbnail images, based on the touch input with respect to each of the thumbnail images, and generates the screen information 152 reflecting a result of the editing. Although not illustrated, the controller 180 shares the screen information 152 reflecting a result of the editing with the one at the other end of the communication.

Specifically, if any one (for example, the fourth thumbnail image) 156' of the multiple thumbnail images is dragged toward the different one (for example, the second thumbnail image) 154', the controller 180 changes the order of the arrangement of the first to fourth thumbnail images 153' to 156'.

Accordingly, as illustrated in FIG. 12(b), the first to fourth thumbnail images 153' to 156' are arranged on the display unit 151, in the following sequence: the first thumbnail image 153', the fourth thumbnail image 156', and the second thumbnail image 154', the third thumbnail 155'.

Thereafter, although not illustrated, if the flick input or the drag input in the second direction is sensed on the first screen information 153 displayed on the display unit 151, the controller 180 makes the first screen information 153 disappear from the display unit 151 and displays the fourth display information 156 on the display unit 151.

Figure 13:
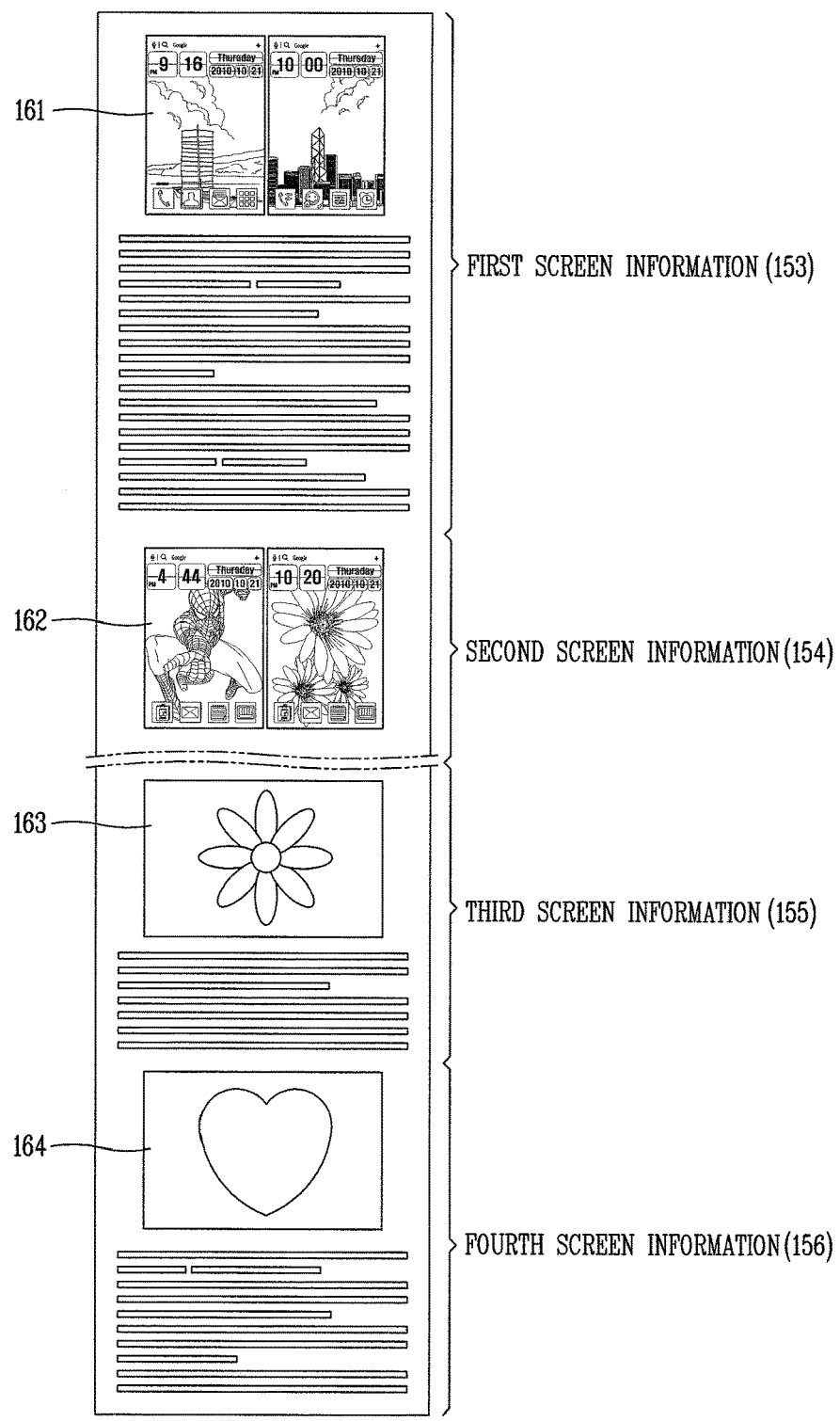
FIG. 13 is a diagram illustrating another example of division of screen information, based on FIG. 3.

FIG. 13 is a diagram illustrating another example of division of screen information, based on FIG. 3. The mobile terminal 100 (refer to FIG. 1) includes the main body, the display unit 151 (refer to FIG. 1), and the controller 180 (refer to FIG. 1).

Because of the size limitation on the display unit 151, the screen image including at least one part of the screen information 152 is displayed on the display unit 151. The screen image here means information displayed on one screen of the display unit 151.

Accordingly, the controller 180 divides the screen information 152 into screen image units. At this time, the controller 180 calculates the number of times that the division is made, based on the number of items of image information included in the screen information 152, in such a manner that the multiple screen information includes each image information. The controller 180 divides the screen information 152 into the multiple items of screen information, based on the calculated number of times.

As illustrated, the controller 180 divides the screen information 152 into the first screen information 153 to the fourth screen information 156, in such a manner that the first screen information 153 to the fourth screen information 156 include the image information 161 to the image information 164, respectively.

Although not illustrated in both of FIG. 4 and FIG. 13, the controller 180 determines how the screen information 152 is divided, based on property information on the touch input with respect to the screen information 152. For example, the controller 180 determines whether the screen information 152 is divided as illustrated in FIG. 4, or is divided as illustrated in FIG. 13, based on at least one of type information, direction information and length information on the touch input. The controller 180 assigns a special effect (for example, a breaking effect) when dividing the screen information 152.

Figure 14:
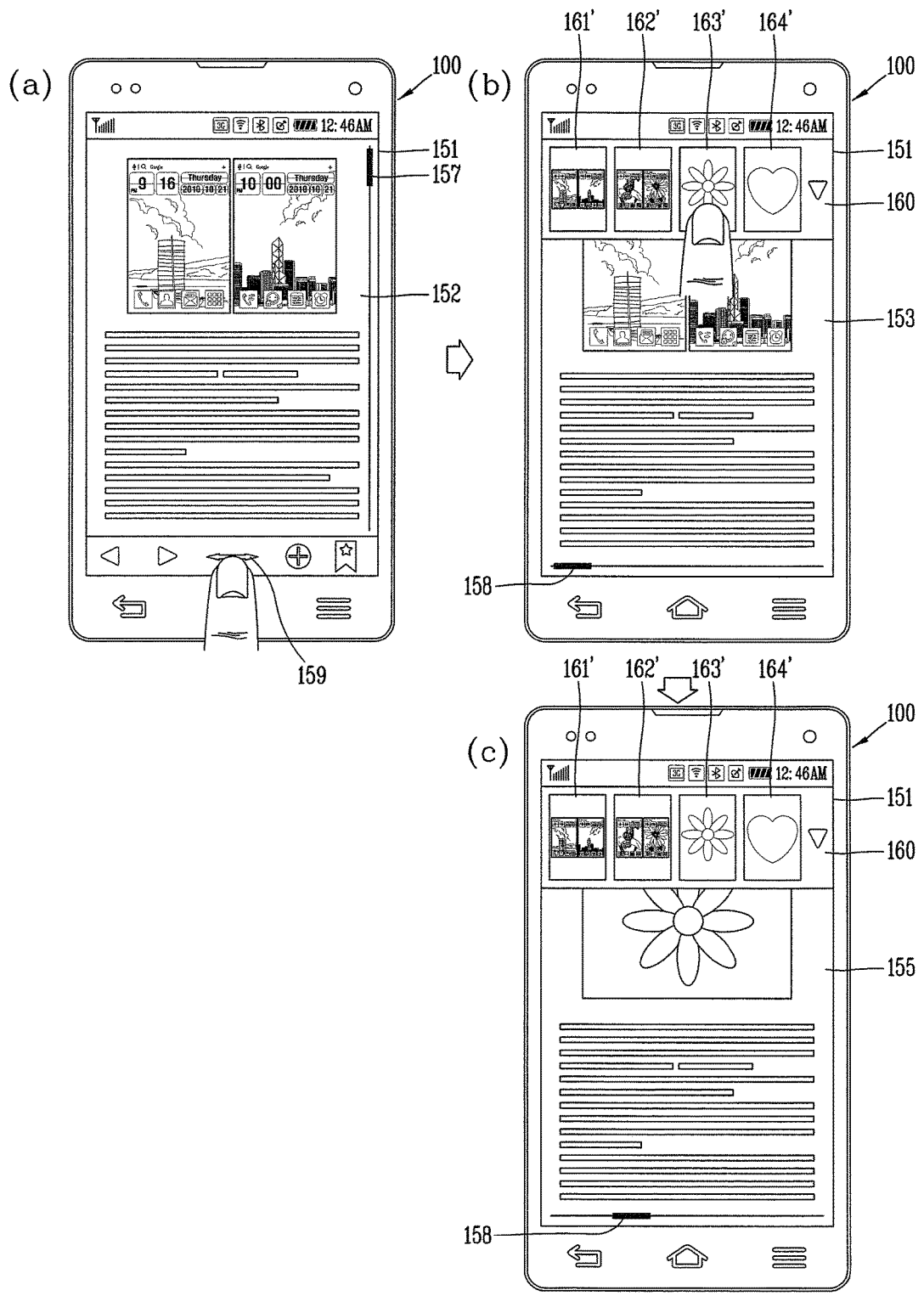
FIG. 14 to FIG. 16 are diagrams, each illustrating an operational example of the mobile terminal, based on FIG. 3.

FIGS. 14(*a*) to (*c*) are diagrams, each illustrating an operational example of the mobile terminal 100, based on FIG. 3. The mobile terminal 100 includes the main body, the display unit 151 (refer to FIG. 1), and the controller 180 (refer to FIG. 1).

Referring to FIG. 14(*a*), the controller 180 displays the virtual button 159, which corresponds to a function of switching the direction in which the scrolling-through is performed, on the display unit 151. As illustrated, the display unit 151 displays at least one part of the screen information 152.

If the virtual button 159 is touched on, referring to FIG. 14(*b*), the controller 180 switches the direction in which the scrolling-through can be performed, from the first direction (for example, the upward and downward direction), to the second direction (for example the leftward and rightward direction).

While switching the direction in which the scrolling-through can be performed, to the second direction, the controller 180 divides the screen information 152 into the first screen information 153 to the fourth screen information 156).

At this time, the controller 180 calculates the number of times that the division is made, and divides the screen information 152 into the multiple items of screen information, based on the calculated number of times, in such a manner that each of the items of screen information includes the image information.

That is, the controller 180 divides the screen information 152 into the first screen information 153 to the fourth screen information 156, in such a manner that the first screen information 153 to the fourth screen information 156 includes the first image information 161 to the fourth image information 164, respectively. The controller 180 displays the first screen information 153 of the first screen information 153 to the fourth screen information 156 on the display unit 151.

Along with this, the controller 180 displays the first to fourth thumbnail images 161' to 164', which correspond to the first image information 161 to the fourth image information 164, respectively, on the display unit 151.

If any one (for example, the third thumbnail image) 163' of the first to fourth thumbnail images 161' and 164' is selected, referring to FIG. 14(*c*), the controller 180 displays the third screen information 155 that includes the third image information 163 corresponding to the third thumbnail image 163', on the display unit 151. That is, the third image information 163 and text information relating to the third image information 163 are displayed on the display unit 151.

Figure 15:
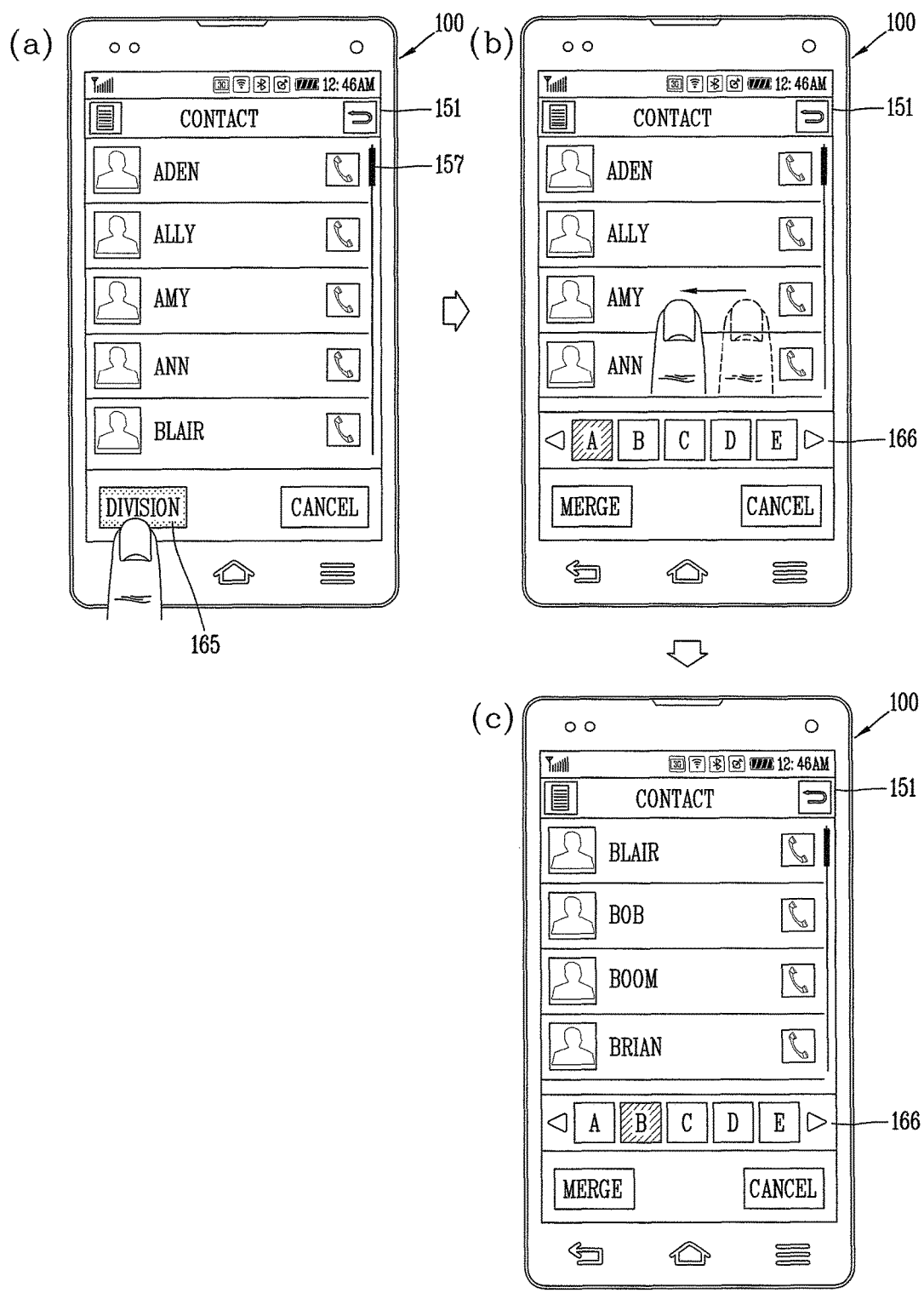
Figure 16:
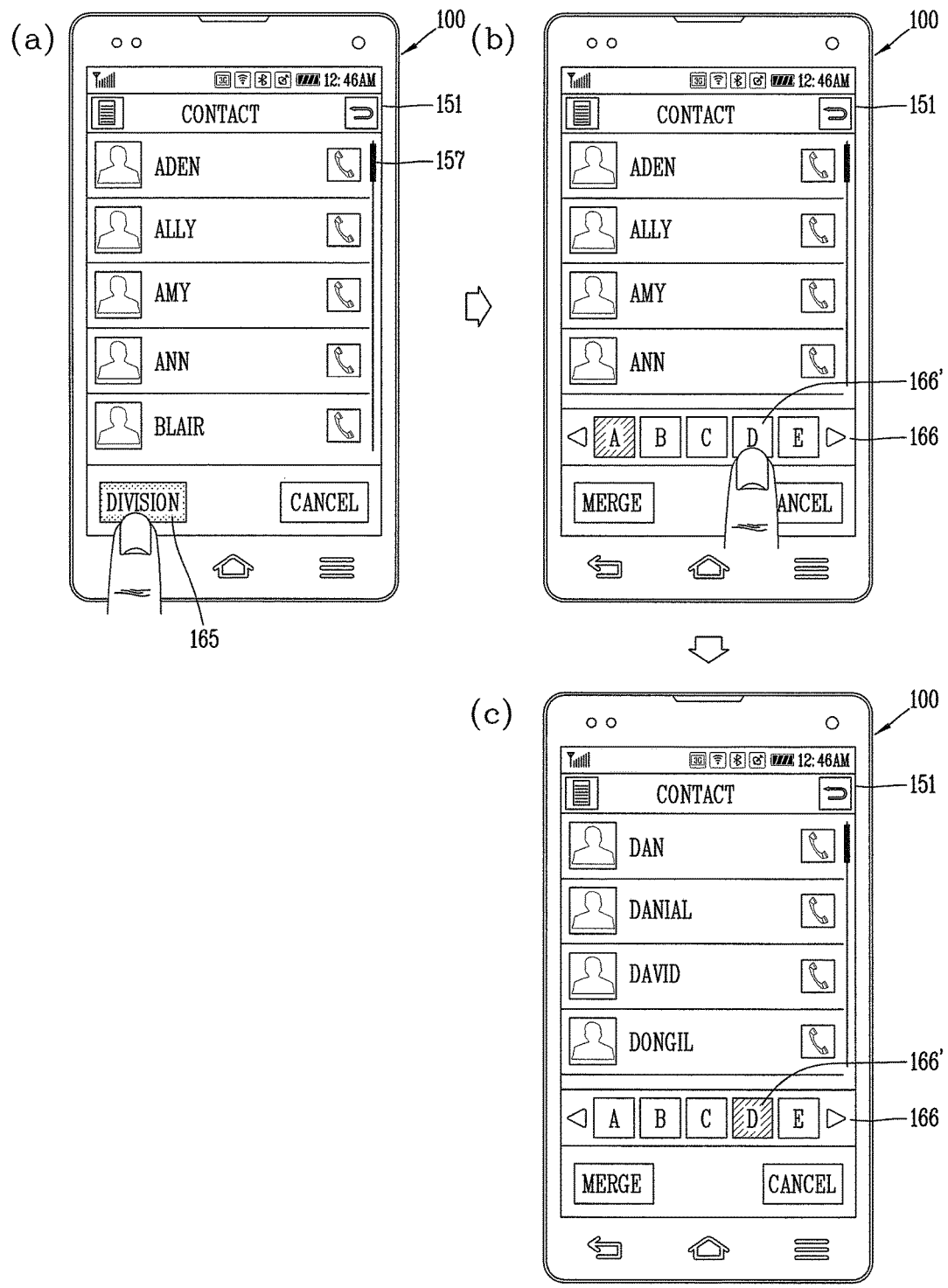

FIG. 15(*a*) to (*c*) and FIG. 16(*a*) to (*c*) are diagrams, each illustrating an operational example of the mobile terminal, based on FIG. 3. The mobile terminal 100 includes the main body, the display unit 151 (refer to FIG. 1), and the controller 180 (refer to FIG. 1).

Referring to FIG. 15(*a*) and FIG. 16(*a*), the display unit 151 displays the screen information that includes multiple contact information items. The screen information is scrolled through in the first direction (for example, in the upward and downward direction). Accordingly, the scroll bar 157 indicating that the screen information can be scrolled through in the first direction is displayed on the display unit 151.

At this time, if an icon (hereinafter referred to as a "division icon") 165 corresponding to a function of grouping the multiple contact items is selected, the controller 180 groups the multiple contact information items by specific condition information.

For example, referring to FIG. 15(*b*) and FIG. 16(*b*), the controller 180 sorts the multiple contact information items into multiple groups, based on an alphabetical letter that comes first in the full name of the user at the other end of the communication. The controller 180 displays the contact information items belonging to one (for example an "A" group) of the multiple groups on the display unit 151.

At this time, the controller 180 displays the multiple icons 166 that correspond to the multiple groups, respectively, on the display unit 151. Of the multiple icons 166, the icon corresponding to the A group is displayed differently from the other icons. For example, the controller 180 changes at least one of the color, the shape, the size, and the transparency of the icon corresponding to the "A" group.

Although the icons 166 are illustrated in the drawings, the scroll bar 158 indicating that the screen information can be scrolled through in the second direction (for example, in the leftward and rightward direction) may be displayed on the display unit 151.

Thereafter, in the flick input or the drag input in the second direction is sensed on the display unit 151, referring to FIG. 15(*c*), the controller 180 makes the contact information items that belongs to one group (for example, the "A" group) of the multiple groups, disappear from the display unit 151, and displays the contact information items belonging to the different group (for example, a "B" group), on the display unit 151.

On the other hand, if any one (for example, an icon corresponding to a "D" group) of the multiple icons 166 displayed on the display unit 151 is selected, referring to FIG. 16(c), the controller 180 makes the contact information items that belong to one (for example, the "A" group) of the multiple groups, appear from the display unit 151, and displays the contact information items that belong to the group (for example, the "D" group) corresponding to the selected icon, on the display unit 151.

At this time, the icon corresponding to the "D" group is displayed differently from the other icons. For example, the controller 180 changes at least one of the color, the shape, the size, and the transparency of the icon corresponding to the "D" group.

Although the displaying of the screen information including the multiple contact information items are illustrated in the drawings, the screen information including multiple content items (moving image content, still image content, voice content, and the like) may be displayed.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

With regard to the mobile terminal described above, the configuration and method of the embodiments described above are not given any limitation to their applications, and all of, or some of the embodiments may be selectively combined with each other in a manner that creates various modifications.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for scrolling a display of a mobile terminal, the method comprising:
displaying a portion of a specific page, wherein the specific page is one of a web page, an E-mail message, an electronic document or a social network page,
scrolling the specific page along a first axis in response to a first touch input, wherein the specific page includes displayed portions that are currently viewable and portions that are not currently viewable, the not currently viewable portions becoming viewable in response to repeated scrolling, wherein the first axis defines a first scrolling orientation for the scrolling of the displayed portions of the specific page, wherein the displayed portions of the specific page have a viewing orientation that is parallel to the first axis while in the first scrolling orientation, and wherein while in the first scrolling orientation, the specific page is continuous and non-partitioned;
receiving a second touch input applied along a second axis orthogonal to the first axis,
transitioning from the first scrolling orientation to a second scrolling orientation in response to the second touch input, wherein the second scrolling orientation is orthogonal to the first scrolling orientation;
dividing the specific page including the displayed portion into multiple contents based on the second touch input,
displaying a first content of the multiple contents on the display,
displaying a plurality of thumbnail images each corresponding to one of the multiple contents, wherein the plurality of thumbnail images are displayed at a same time as the displaying of the first content on the display, wherein the first content corresponds to a first thumbnail image among the plurality of thumbnail images,
stopping the displaying of the first content and displaying a second content of the multiple contents in response to a third touch input applied in a direction of the second axis,
wherein the first content and the second content are included in the multiple contents of the specific page,
receiving a fourth touch input selecting a thumbnail image of the plurality of thumbnail images, and
stopping the displaying of the second content and displaying a third content corresponding to the selected thumbnail image on the display in response to the fourth touch input.

2. The method of claim 1, wherein a number of the multiple contents is determined according to a viewable area of the display at which the displayed portion of the specific page is displayed.

3. The method of claim 2, wherein the number is determined after receiving the second touch input.

4. The method of claim 1, further comprising:
displaying an icon on the display; and
transitioning from the first scrolling orientation to the second scrolling orientation in response to the second touch input received with regard to the icon,
wherein the second axis defines the second scrolling orientation for scrolling of the plurality of thumbnail images.

5. The method of claim 1, wherein the first and second touch inputs are either a flick input or a drag input.

6. The method of claim 1, wherein the displaying of the plurality of thumbnail images occurs at a first area of the display and the displaying of the first content occurs at a second area of the display.

7. The method of claim 6, further comprising:
displaying a particular content of the multiple contents at the second area of the display in response to a user selection received with regard to a corresponding particular thumbnail image of the plurality of thumbnail images.

8. The method of claim 6, further comprising:
changing order of the plurality of thumbnail images responsive to user selection received with regard to the displayed plurality of thumbnail images, wherein the specific page is viewable as a partitioned plurality of regions which have an order that is changed in a manner that corresponds to the changed order of the plurality of thumbnail images.

9. The method of claim 6, further comprising:
terminating displaying of a currently viewable displayed portion of the specific page at the second area of the display in response to a fifth touch input; and
displaying the plurality of thumbnail images at the first area of the display, wherein the first area of the display is expanded to also include the second area of the display.

10. The method of claim 9, further comprising:
changing order of the plurality of thumbnail images responsive to user selection received with regard to the displayed plurality of thumbnail images.

11. A mobile terminal, comprising:
a display; and
a controller operatively coupled to the display, wherein the controller is configured to:
cause the display to display a portion of a specific page, wherein the specific page is one of a web page, an E-mail message, an electronic document or a social network page,
cause the display to scroll the specific page along a first axis in response to a first touch input, wherein the specific page includes the displayed portions that are currently viewable and portions that are not currently viewable, the not currently viewable portions becoming viewable in response to repeated scrolling, wherein the first axis defines a first scrolling orientation for the scrolling of the displayed portions of the specific page, wherein the displayed portions of the the specific page have a viewing orientation that is parallel to the first axis while in the first scrolling orientation, and wherein while in the first scrolling orientation, the specific page is continuous and non-partitioned;
receive a second touch input applied along a second axis orthogonal to the first axis,
transition from the first scrolling orientation to a second scrolling orientation in response to the second touch input, wherein the second scrolling orientation is orthogonal to the first scrolling orientation; and
divide the specific page including the displayed portion into multiple contents based on the second touch input,
cause the display to display a first content of the multiple contents on the display,
cause the display to display a plurality of thumbnail images each corresponding to one of the multiple contents, wherein the plurality of thumbnail images are displayed at a same time as the displaying of the first content on the display, wherein the first content corresponds to a first thumbnail image among the plurality of thumbnail images,
cause the display to stop the displaying of the first content and display a second content of the multiple contents in response to a third touch input applied in a direction of the second axis,
wherein the first content and the second content are included in the multiple contents of the specific page,
receive a fourth touch input selecting a thumbnail image of a plurality of thumbnail images,
cause the display to stop the displaying of the second content and display a third content corresponding to the selected thumbnail image among the multiple contents of the specific page on the display in response to the fourth touch input.

12. The mobile terminal of claim 11, wherein a number of the multiple contents is determined according to a viewable area of the display at which the displayed portion of the specific page is displayed.

13. The mobile terminal of claim 12, wherein the number is determined after receiving the second touch input.

14. The mobile terminal of claim 11, wherein the controller is further configured to:
cause the display to display an icon; and
transition from the first scrolling orientation to the second scrolling orientation in response to the second touch input received with regard to the icon,
wherein the second axis defines the second scrolling orientation for the scrolling of the plurality of thumbnail images.

15. The mobile terminal of claim 11, wherein the first and the second touch inputs are either a flick input or a drag input.

16. The mobile terminal of claim 11, wherein the displaying of the plurality of thumbnail images occurs at a first area of the display and the displaying of the first content occurs at a second area of the display.

17. The mobile terminal of claim 16, wherein the controller is further configured to:
cause the display to display a particular content of the multiple contents at the second area of the display in response to a user selection received with regard to a corresponding particular thumbnail image of the plurality of thumbnail images.

* * * * *